March 24, 1959　　　J. W. O'BRIEN　　　2,878,869
MISCUT MECHANISM FOR FLYING SHEARS

Filed March 14, 1955　　　　　　　　　　　　4 Sheets-Sheet 1

INVENTOR.
JEREMIAH W. O'BRIEN
BY
J. E. Dickinson
HIS ATTORNEY

United States Patent Office 2,878,869
Patented Mar. 24, 1959

2,878,869

MISCUT MECHANISM FOR FLYING SHEARS

Jeremiah W. O'Brien, Pleasant Hills, Pa., assignor to United Engineering and Foundry Company, Pittsburgh, Pa., a corporation of Pennsylvania Application March 14, 1955, Serial No. 494,041

11 Claims. (Cl. 164—68)

This invention relates to flying shears employed for shearing continuous moving metallic material and in particular to a miscut mechanism employed in conjunction with such shears.

In the shearing of metallic workpieces such as billets, bars and the like, the operation is of such a nature that it does not require continuous operation of the shear between cuts and therefore it is desirable to employ in conjunction with the shear an intermittently operable drive. In the operation of shears for dividing such heavy workpieces, it becomes necessary to accelerate the blades rapidly and in one revolution in order to match the speed of the moving material at the time a cut is to be made and then decelerate and stop the shear in one revolution to prevent another cut from being made. However, in shearing material which is traveling at speeds of the order of 1000 feet per minute and greater, it becomes highly impractical to operate the shear on a one revolution shearing cycle basis due to the short time permitted to accelerate the blades from rest to the high speed required and then to decelerate the blades from the high speed to zero speed. Such difficulties are overcome by the shear herein provided inasmuch as a miscut mechanism is included which permits the blades to rotate more than one revolution in order to attain the proper blade cutting speed.

It is, therefore, an object of this invention to provide a shear having a miscut mechanism adapted to permit the shear blades to perform a miscut thereby enabling the shear to attain the desired shearing velocity prior to engaging the workpiece.

It is another object of this invention to provide in combination with an intermittently operable shear a mechanism so arranged as to render the shear blades inoperative when they pass closely adjacent to one another during a certain portion of the shearing cycle thereby to enable the shear to miss a cut in order to permit the speed of the blades to be accelerated from rest to a speed equal to that of the workpiece when a cut is made and then to permit the shear to be stopped before the shear blades again come into cutting relationship.

Still another object of this invention is to provide a miscut mechanism consisting of two pairs of cranks with one pair connected to one of the shear blades and the other to the remaining shear blade and adapted to be rotated in timed relationship to cause the blades to make a miscut during a certain portion of the shearing cycle.

It is a further object of this invention to provide in combination with an intermittently operable flying shear a miscut mechanism capable of causing the shear to miss the number of cuts as may be desired during one shearing cycle.

These objects, as well as the various other novel features and advantages of this invention will become apparent from the following description and accompanying drawings of which:

Figure 1:
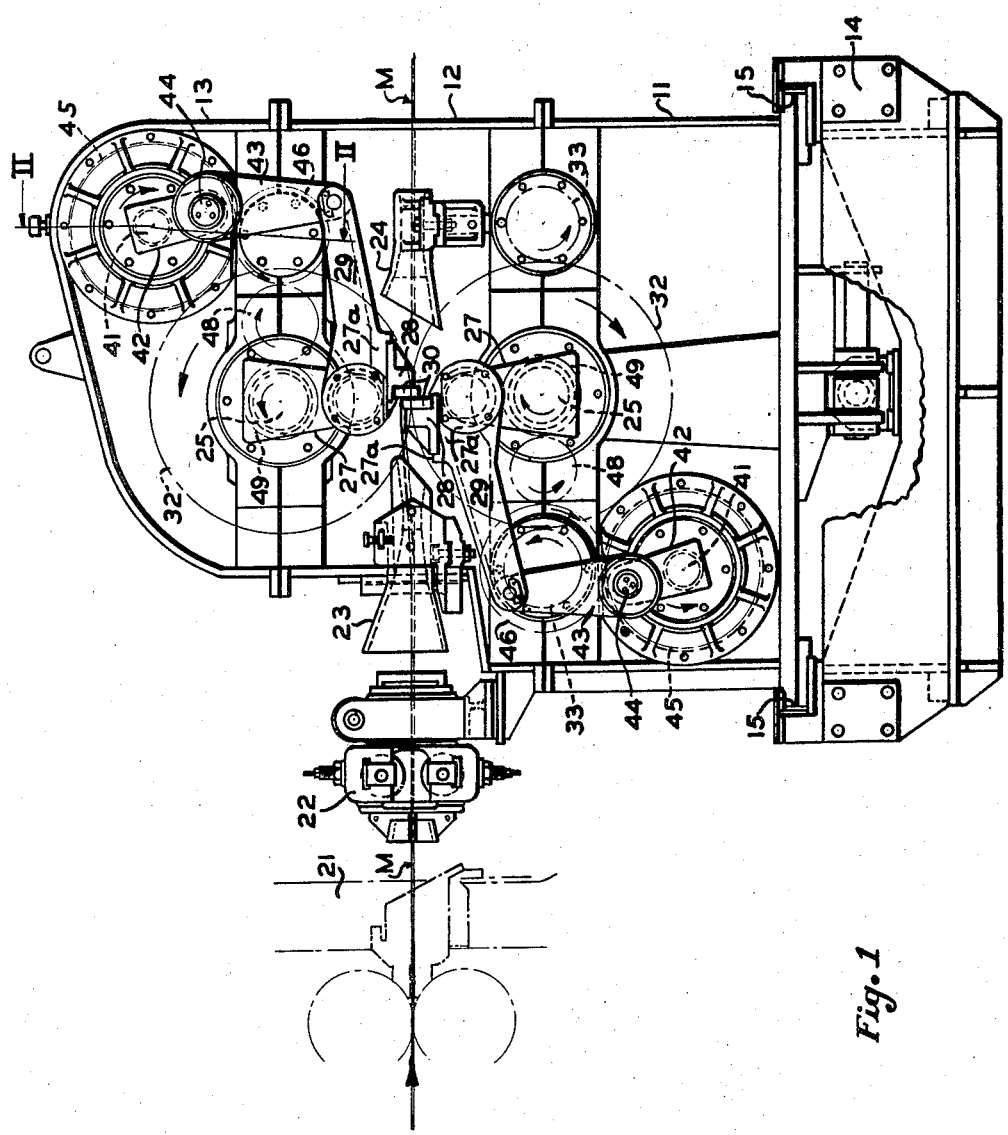
Figure 1 is a side elevation view of a flying shear of the intermittently operable type having a miscut mechanism embodied therein incorporating the features of the invention herein disclosed.
Figure 2:
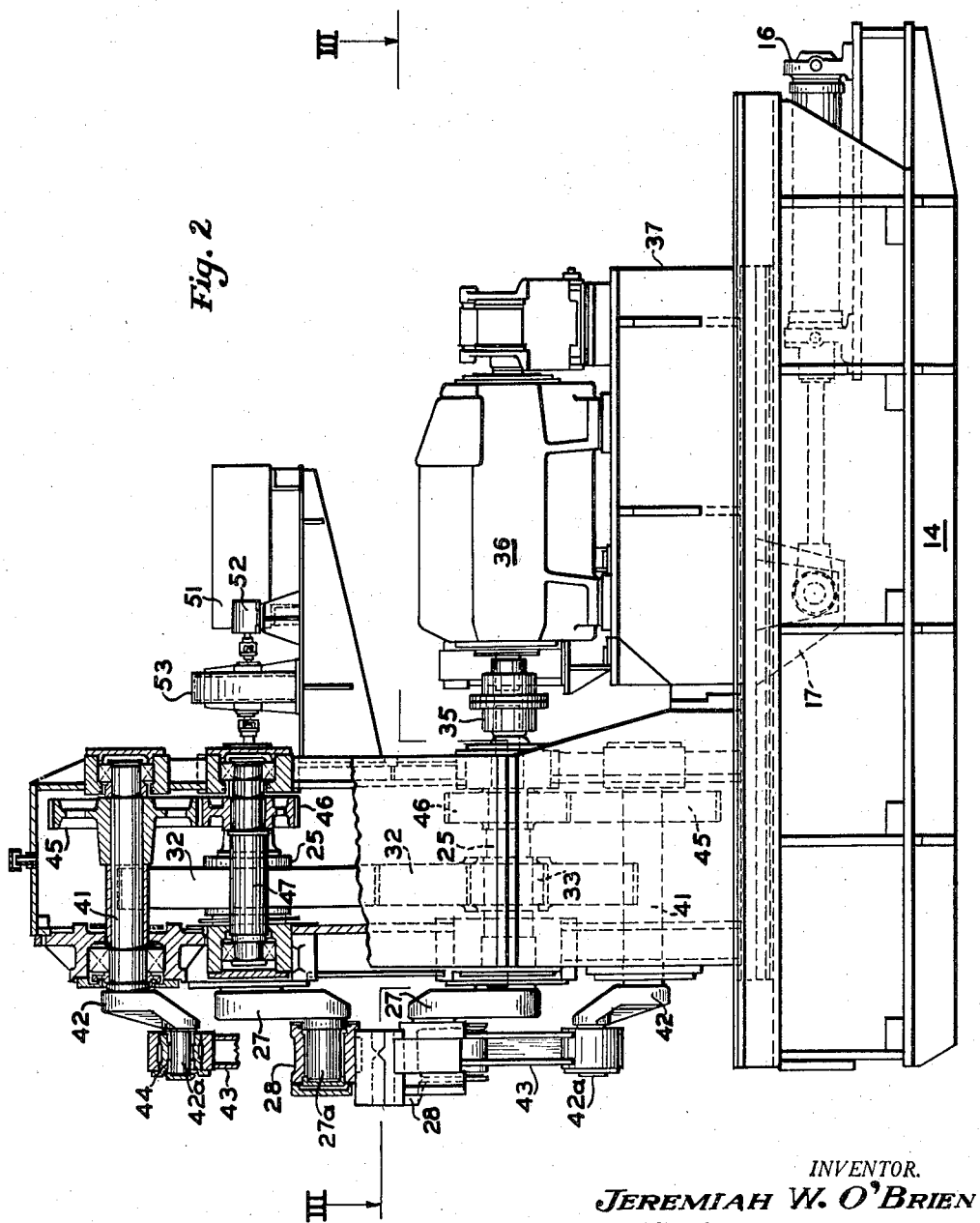
Figure 2 is a sectional elevational view taken on line II—II of Figure 1 including partial sections of the top crank end portions.
Figure 3:
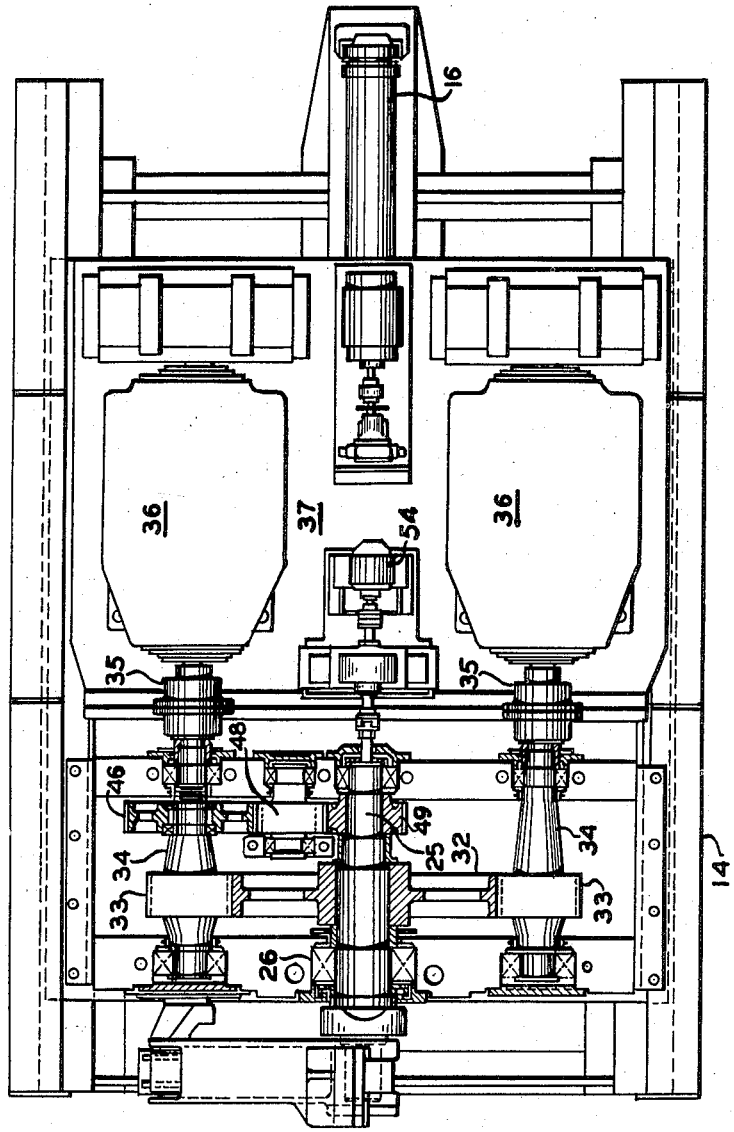
Figure 3 is a sectional plan view taken on line III—III of Figure 2.

With reference to the drawings Figures 1, 2 and 3, there is illustrated therein the preferred form of the present invention in which the shear comprises a housing of three sections 11, 12 and 13 arranged in superposed relationship to form a vertically disposed hollow casing slidably mounted upon a base 14 having suitable guides 15 provided thereon and along which the shear housing may be moved by means of a double acting piston-cylinder assembly 16 mounted in the base and connected to a downwardly projecting bracket 17 secured to the housing section 11. This movement of the housing provides for positioning the shear in the proper position desired for cutting workpieces in one of several lines of a mill.

As best shown in Figure 1, the housing 11 is arranged closely adjacent to a rolling mill stand 21 and is equipped with a roller type guide 22 which communicates with the delivery side of the mill and serves to direct the bar M from the mill into the mouth of a second guide 23 located at the entry side of the shear and which, in turn, directs the material through the shear and into a delivery guide 24 at the opposite side of the shear. All of the guides are adjustable so that they may be readily aligned with each other and with the mill and shear pass line.

Mounted within the housing there are two parallel shafts 25 each mounted in roller bearings 26 and provided with a crank 27 at one end thereof. To the outer end 27a of the cranks there are secured shear blade carriers 28 having an arm 29 which extends generally in a horizontal direction parallel to the shear housing. The blade carriers 28 are equipped with shear blades 30 which, during a shearing operation, overlap in a manner as shown in Figure 1. Keyed to each shaft 25 there is a large main gear 32, the gears being in mesh with each other thereby assuring identical rotation of the two cranks 27. The gears 32 are driven by pinions 33 whose axes lie in the same horizontal plane containing the axis of the lower gear 32, the pinions 33 being keyed to shafts 34 supported in suitable bearings and connected by means of couplings 35 to the shafts of similar motors 36. The motors 36 are mounted on a platform 37 secured to the base 14 as shown particularly in Figure 2 so that the motors and the component parts move with the shear housing on actuation of the piston-cylinder assembly 16.

On opposite sides of the mill pass line and with their axes parallel to each other there is a pair of horizontal shafts 41 supported in suitable bearings mounted in the shear housing. At one end of each of the shafts there is rigidly mounted a crank 42 having an outwardly projecting crank arm 42a. The crank arms 42a are contained in the same vertical plane as the crank arms 27a of the cranks 27. To each of the blade carriers 29 and at the end opposite the blade carried thereby, there is pivotally secured a link 43 which, at its opposite end, is pivotally connected to the crank arm 42a. At the connecting point between the link 43 and the crank arm 42a there is an eccentric bushing 44 adapted to be adjusted so as to compensate for wear of the shear blades.

As shown in Figure 2, the lower crank shaft 41 has keyed to it a gear 45 which meshes with an intermediate idler pinion 46 freely mounted upon lower pinion shaft 34 and which pinion, in turn, meshes with a second idler pinion 48, which meshes with and is driven by a pinion 49 keyed to the lower main gear shaft 25 as shown in Figure 3. For driving the upper crank shaft 41, as shown in Figure 2, there is keyed thereto a gear 45 which, through a pair of intermediate pinions 46 and 48, is driven by a pinion 49 keyed to the upper main gear shaft 25.

Figure 4:
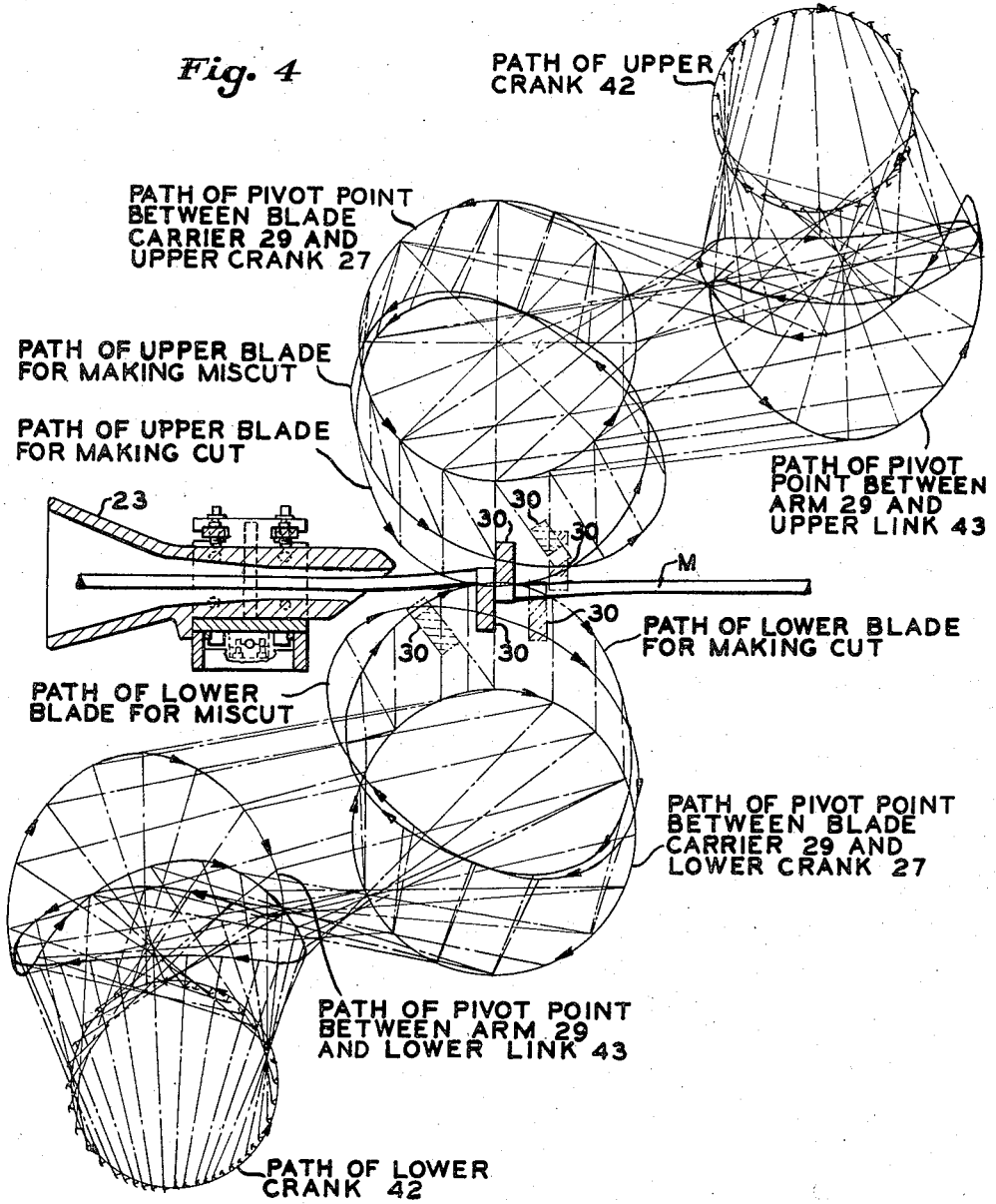
Figure 4 is a diagram defining the paths taken by the upper and lower shear blades when one miscut is made.

With the foregoing arrangement it is to be observed that for each revolution of the main gears 32 the blade carriers also will travel through one complete revolution but, by reason of the proportion of parts of the miscut mechanism incorporated in the shear, a cut will not be made except on every other revolution of the shear. Of course, by altering the gear proportions, the number of miscuts may be varied. According to the present arrangement, due to the relative ratios of the gears 45 and 49, though the shear blades pass adjacent one another on each revolution of the shear, they are, during the miscut portion of their travel, tilted out of the normal vertical cutting position thereby providing a space between the blades through which the workpiece freely passes. The pivotal action is brought about by reason of a difference in diameters between the gears 45 and 49. In the instant case the ratio between the diameters of gears 45 and 49 is 2:1. For the first revolution of the cranks 27, the cranks 42 will have rotated but one-half revolution so that the pivots 44 of cranks 42 will be at diametrically opposite points to those shown in Figure 1, and by reason of which the arms 43 will thereby be in such a position as to cause the blade carriers to be pivoted in a counterclockwise direction on their cranks 27 and to tilt the blades away from their cutting relationship as shown diagrammatically in Figure 4. However, on the completion of the next revolution of the cranks 27, the cranks 42 and blade carriers 28 with their interconnecting links 43 will be in their positions as shown in Figure 1 and Figure 4 thereby causing the blades to intersect the workpiece and make a cut.

There is included in the control circuit for the intermittently operable flying shear a high speed limit switch 51 connected through a small reducer 53 to the upper drive shaft 25 for controlling the dynamic and magnetic braking of the shear motors 36 so as to bring them to a stop after a cut has been made. For the purpose of resetting the shear on completion of a cut there is provided in the electrical circuit a zero-speed limit switch 52 also connected to the upper drive shaft 25 through the reducer 53 and adapted to cause the motors 36 to reverse themselves and return the shear to the zero or starting position. In order that the shear motors be energized at the proper instant so as to bring the shear blades up to the speed of the workpiece before shearing, there is also included in the electrical circuit, but not shown in the drawings, a flag switch or electric eye of the well known type positioned a sufficient distance ahead of the shear either before or after the mill and adapted to be influenced by the leading end of the workpiece for connecting the shear motors 36 into the electrical circuit. There are also included in the electrical circuit a selsyn transmitter and an electrical tachometer 54, as shown in Figure 3, thereby providing a means for accurately checking the speed of the shear.

The operation of the shear and the miscut mechanism may be briefly summarized as follows:

Either prior to entering or on issuing from the mill 21 the leading end of the bar M will trip the limit switch or interrupt the beam of light for the photo-cell, whichever may be provided in the circuit, thereby causing the motors 36 to be energized and the shear to be rotated. On the first revolution of the shear the paths of the blade cutting edges are as shown on Figure 4 and the blades 30 are tilted away from their cutting positions so as to provide a sufficient opening for permitting the bar to pass freely therebetween. Thus, ample time is provided for accelerating the shear during the first revolution and, if necessary, during a portion of the second revolution so that when the blades engage with the bar at the completion of the second revolution to make a cut they will have attained the speed of the bar. The paths of the blade cutting edges during the second revolution are also shown diagrammatically in Figure 4. After a cut has been completed, the limit switch 51 is immediately tripped to bring the motors 36 and the shear to a stop within less than the number of revolutions which would be required for again bringing the blades together to make a cut, in the present instance two revolutions, so as to prevent the blades from inadvertently coming in contact with the material. At the same time, the limit switch 52 is closed to cause the motors 36 to reverse themselves and return the blades 30 to their initial or starting position at which point the motors 36 are stopped by the action of the limit switch 52.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. A miscut mechanism for a flying shear comprising two pairs of cranks of which one pair is positioned on either side of the path of travel of material to be cut by the shear, each pair of said cranks comprising a primary crank and a secondary crank adjacent thereto and so connected as to rotate differentially with respect to one another, a shear blade pivotally mounted on each of said primary cranks, a link interconnecting each of said secondary cranks to the shear blade mounted on the primary crank adjacent thereto, each of said blades being operably arranged to be displaced away from the normal cutting position when said cranks are rotated so as to permit the material to pass freely between the blades during the interval within which a cut normally would be made.

2. A miscut mechanism according to claim 1 in which there are included a reversible motor means for uniformly rotating said primary cranks thereby to cause said blades to make a cut and control means comprising a high speed limit switch and a zero speed limit switch operably connected to said motor means for stopping, reversing and again stopping said motor means thereby to return said blades to their starting positions before another cut is made.

3. A miscut mechanism according to claim 1 in which there are included a common drive for uniformly rotating said primary cranks and an intermediate driving connection between said common drive and said secondary cranks and operably arranged to rotate said secondary cranks at a speed which differs from that of the primary cranks.

4. A miscut mechanism according to claim 1 in which each of the blades is mounted on a separate carrier pivotally connected at one end to each of said primary cranks and operably connected to each of said secondary cranks.

5. A miscut mechanism for a flying shear comprising two pairs of cranks of which one pair is positioned on either side of the path of travel of material to be cut by the shear, said cranks of each pair comprising a primary crank and a secondary crank so connected as to rotate differentially with respect to each other, a shear blade carrier pivotally connected to each of said primary cranks, a link interconnecting each of said carriers to each of said secondary cranks and a drive for rotating said cranks and operably arranged to cause said blade carriers to be displaced away from the normal cutting position of the blades supported thereby so as to permit the material to pass freely therebetween throughout an interval during which a cut normally would be made.

6. A miscut mechanism according to claim 5 in which reversible motor means are provided for driving the cranks in one direction from an initial starting position to cause the blades to make a cut and in the opposite direction to cause the blades to be returned to their initial starting position before another cut is made.

7. A miscut mechanism according to claim 5 in which an eccentric is operably connected to each of the blade carriers and adapted to be rotated for adjusting the position of one blade with respect to the other.

8. A flying shear including a miscut mechanism comprising a frame, a pair of shafts, a primary crank secured to one end of each of said shafts, similar main gears mounted on the crank end of each of said shafts and in mesh with each other to cause rotation of said primary cranks, a second gear mounted on each of said main shafts, a drive shaft having a gear mounted thereon in mesh with one of said main gears, power means connected to said drive shaft for driving said gearing, a pair of secondary shafts, a secondary crank mounted at one end of each of said secondary shafts, a gear mounted on each secondary shaft having a gear ratio greater than 1:1 with respect to said second gear of said main shaft, pinions connecting said secondary gear and the other of said main gears, a blade carrier adjacent to each of said secondary cranks and pivotally secured to each of said primary cranks, a link pivotally connecting a blade carrier to the secondary crank adjacent thereto, and a shear blade mounted on each of said blade carriers, said carriers adapted to be displaced when said cranks are rotated whereby said blades are withdrawn from their normal cutting positions so as to permit the material to pass freely between the blades during the interval within which a cut normally would be made.

9. A flying shear including a miscut mechanism comprising a frame, a pair of shafts mounted within said frame and with one of the shafts on either side of a material pass line, a primary crank mounted at one end of each of said shafts and contained within the same vertical plane, similar gears mounted one on each of said shafts and in mesh with each other to cause said shafts to rotate at the same speeds, a second gear mounted on each of said shafts, a drive shaft having gears mounted thereon and in mesh with one of said main gears, power means connected to said drive shaft, a pair of parallel secondary shafts mounted in said frame vertically disposed with respect to one another and positioned on either side of the material pass line, a secondary crank mounted on each of said secondary shafts, separate similar gears mounted on each of said secondary shafts having a ratio of greater than 1:1 with respect to the second gears mounted on the drive shaft and connected together in driving relationship, a shear blade and a carrier pivotally mounted on each of said main cranks and a link pivotally connected to each of said carriers and to each of said secondary cranks, said carriers adapted to be displaced by rotation of said cranks to cause the blades to be withdrawn from their normal cutting positions so as to permit material to pass freely therebetween during the interval within which a cut normally would be made.

10. A flying shear including a miscut mechanism according to claim 9 in which there is included means operatively connected to at least one of the blade carriers for adjusting the shear blades relative to each other.

11. A flying shear including a miscut mechanism according to claim 9 in which there is included an eccentric bushing operatively connected to at least one of said carriers adapted to be adjusted for varying the position of one shear blade with respect to the other.

References Cited in the file of this patent

UNITED STATES PATENTS

| | | |
|---|---|---|
| 1,910,387 | Hahn | May 23, 1933 |
| 1,913,153 | Salardi | June 6, 1933 |
| 1,959,852 | Biggert et al. | May 22, 1934 |
| 1,969,433 | Smitmans | Aug. 7, 1934 |
| 2,756,821 | Phipps | July 31, 1956 |

FOREIGN PATENTS

| | | |
|---|---|---|
| 796,341 | France | Jan. 22, 1936 |